United States Patent [19]

Noe

[11] Patent Number: 4,600,036

[45] Date of Patent: Jul. 15, 1986

[54] MECHANICAL SEAL PLUGS FOR FLUID-SEALING OF TUBES

[76] Inventor: Renato R. Noe, Union City, N.J.

[21] Appl. No.: 647,662

[22] Filed: Sep. 6, 1984

Related U.S. Application Data

[63] Continuation of Ser. No. 545,168, Oct. 25, 1983, Pat. No. 4,474,216.

[51] Int. Cl.$^4$ .............................................. F16L 55/10
[52] U.S. Cl. ......................................... 138/89; 411/44
[58] Field of Search ................... 138/89, 90; 220/237; 411/34, 44, 37, 55, 63, 75

[56] References Cited

U.S. PATENT DOCUMENTS

| | | | |
|---|---|---|---|
| 3,107,696 | 10/1963 | Ver Nooy | 138/89 |
| 3,842,612 | 10/1974 | Arnold | 138/89 X |
| 3,933,180 | 1/1976 | Carter | 138/89 |
| 4,310,029 | 1/1982 | Dudek | 138/89 |
| 4,381,800 | 5/1983 | Leslie | 138/90 |
| 4,385,643 | 5/1983 | Noe | 138/90 |

*Primary Examiner*—James E. Bryant, III
*Attorney, Agent, or Firm*—Bernard J. Murphy

[57] ABSTRACT

The mechanical seal plug comprises a body having a longitudinal axis and being centrally bored and threaded to receive a threaded nosepiece therein. An end of the nosepiece, i.e., in the shank end thereof, has a recess, of hexagonal configuration, to receive the working end of a hexagonal wrench. The nosepiece has a reduced diameter portion, the same being a portion of the shank thereof, which has a flat, circumferential shoulder. The body also has a flat, circumferential surface, normal thereto, which confronts the shoulder. An elastomeric seal is disposed between the confronting shoulder and normal surface so that, upon the shank of the nosepiece being threadedly turned, to compress the seal, the latter expands its outside diameter to effect a fluid-sealing engagement with the inner surface of a tube into which the plug shall have been inserted. Additionally, a plurality of jaws are independently engaged with the body, and constrained thereabout, and are movable relative thereto to grip such inner surface of such tube. The body has a ramp surface, upon which the jaws move under the urging of a nut threadedly engaged with the body, to radiate outwardly to effect the aforesaid grip.

9 Claims, 6 Drawing Figures

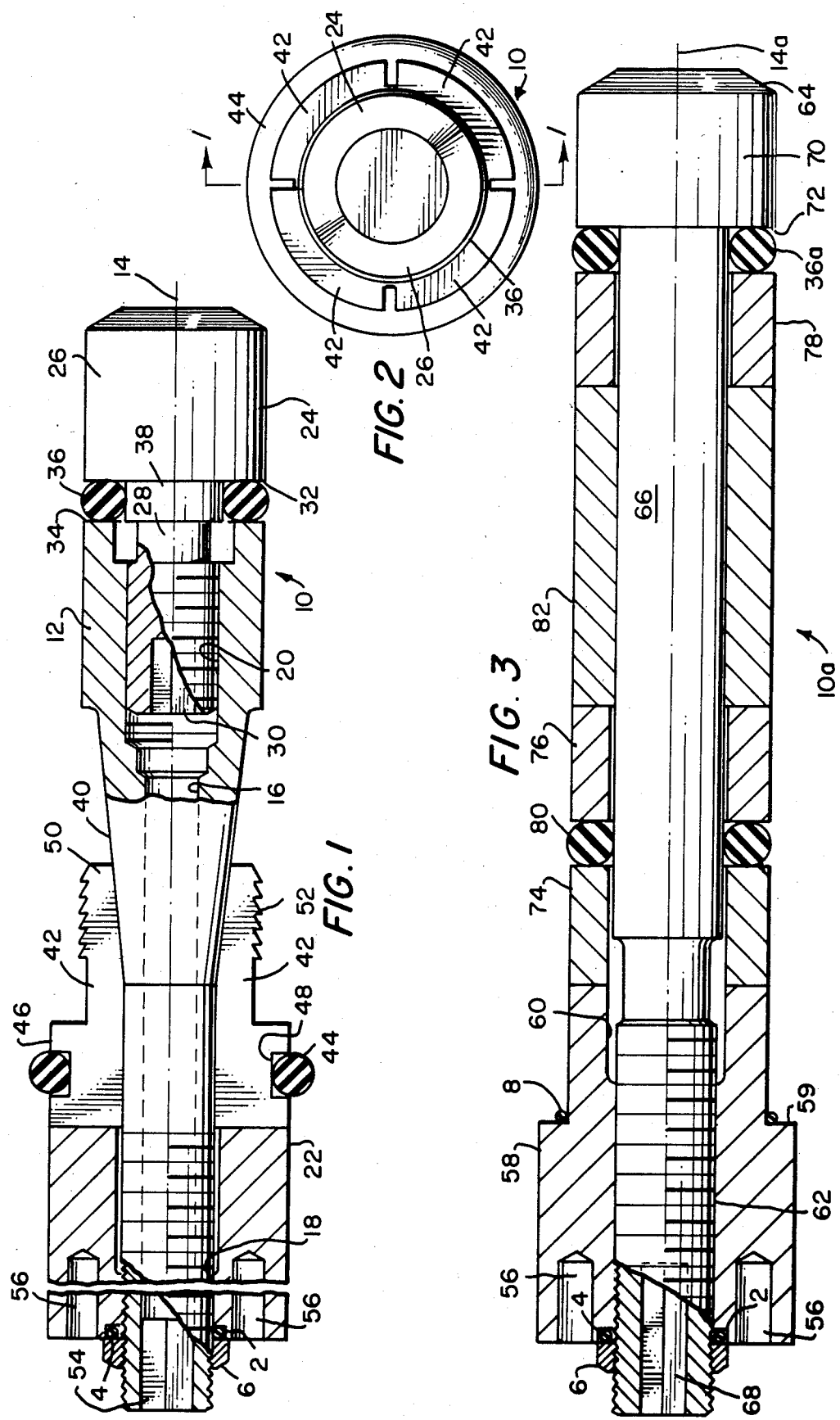

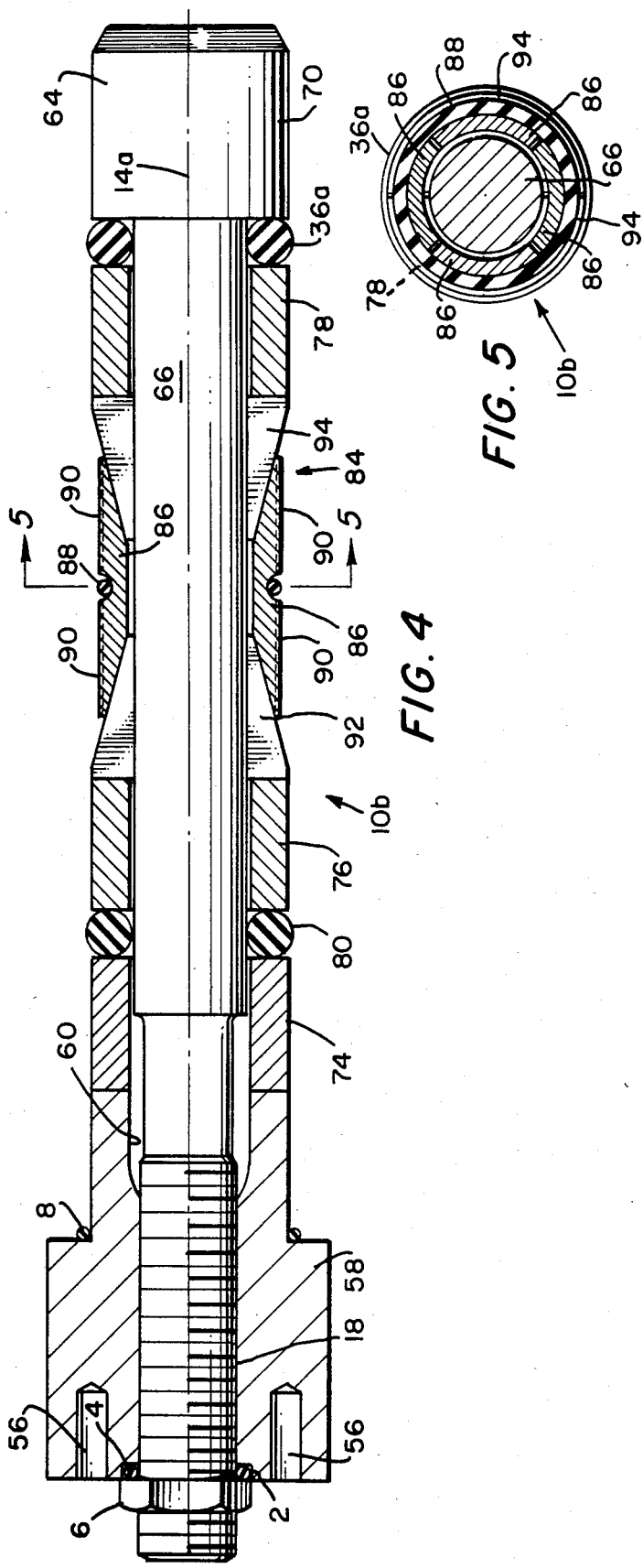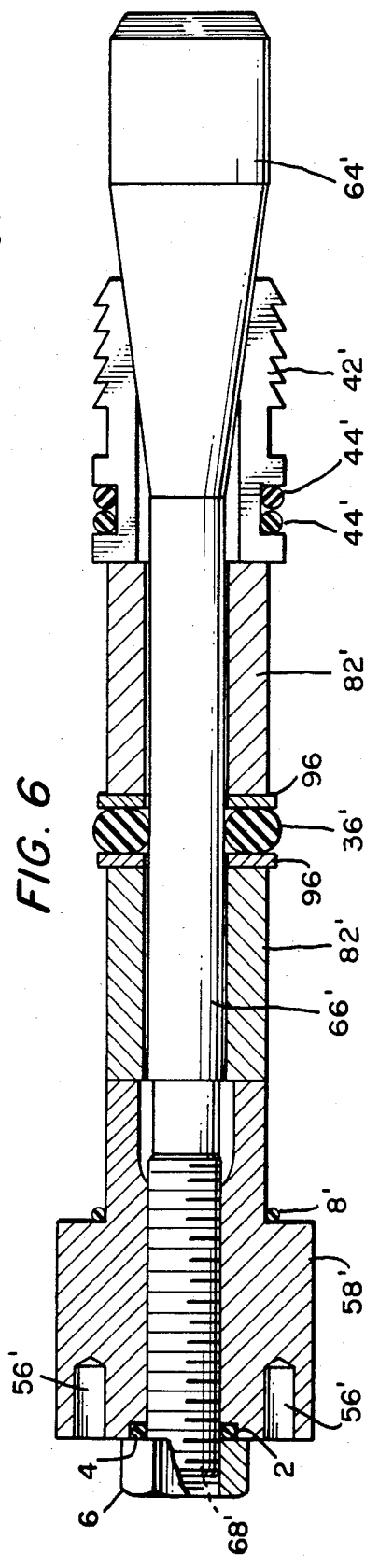

MECHANICAL SEAL PLUGS FOR FLUID-SEALING OF TUBES

This is a continuation of application Ser. No. 545,168 filed Oct. 25 1983 now U.S. Pat. No. 4,474,216.

This invention pertains to plugs, and in particular to plugs designed for a mechanical sealing of tubes, in tube-and-shell heat exchangers, or the like, having means for sealing off a tube and means for gripping the inside surface of such tube.

The invention is similar, in many respects, to the "Plug for High-Pressure Testing of Tubes", U.S. Pat. No. 4,385,643, issued on May 31, 1983, to Renato R. Noe. However, the aforesaid patented plug has a throughgoing channel formed therein, fully throughout the length thereof, to accommodate fluid flow therethrough. According to the instant invention, the plug prevents fluid flow therethrough, and fully closes off a tube, in which it is operatively disposed, to fluid flow.

It is an object of this invention to set forth a plug, for fluid-sealing of tubes, comprising first means defining a plug body having a central, longitudinal axis; said body having a threaded bore formed therein, axially; second means defining a nosepiece; said nosepiece having a shank portion which is externally threaded; said shank portion being threadedly engaged with said bore; said nosepiece having means manipulatable for causing said nosepiece threadedly to extend from, and retract toward said body; an expandable seal interpositioned between said body and said nosepiece; third means circumscribing one of said first and second means, and movable therealong, for effecting fast, gripping engagement with an inner surface of a tube; one of said first and third means comprising means for moving said third means to cause said third means to effect fast, gripping engagement with an inner surface of a tube; said shank portion comprises a straight cylindrical area, parallel with said axis; said seal is set in frictional, circumscribing engagement with said area; said nosepiece further comprises a circumferential shoulder, normal to said axis, terminating said area, and against which said seal comes to bear, upon said nosepiece being manipulatably retracted toward said body; and one of said first and third means has means defining a flat, circumferential surface, parallel with said shoulder, and coactive with the latter for causing said seal to (a) be compressed therebetween, (b) increase in outside diameter only, as a result of compression thereof, and (c) effect fluid-sealing engagement with an inner surface of a tube.

Further objects of this invention, as well as the novel features thereof, will become more apparent by reference to the following description, taken in conjunction with the accompanying figures, in which:

FIG. 1 is a longitudinal view of a first embodiment of the invention, portions thereof being cross-sectioned;

FIG. 2 is an end view of the embodiment of FIG. 1, taken from the right-hand end of FIG. 1;

FIG. 3 is a longitudinal view of a second embodiment of the invention, constitutent components thereof being cross-sectioned;

FIG. 4 is a longitudinal view of a third embodiment of the invention, constitutent components thereof, again, being cross-sectioned;

FIG. 5 is a cross-sectional view taken along section 5—5 of FIG. 4; and

FIG. 6 is a longitudinal view of a fourth embodiment of the invention; the several parts thereof, excepting the body, being cross-sectioned.

As shown in FIGS. 1 and 2, the first embodiment of the novel, mechanical sealing plug 10 comprises a body 12 having a central longitudinal axis 14, and an axially-extending bore 16. The bore is threaded at 18 and 20, to threadedly receive a threaded nut 22 and a nosepiece 24, respectively, at opposite ends thereof. The nosepiece 24 has a nose portion 26, and a shank portion 28. The latter has a recess 30 in the terminal end thereof of hexagonal conformation, and it joins the nose portion 26 through a circumferential shoulder 32 which is normal to the axis 14. The nosepiece-receiving end of the body 12 has a flat, circumferential surface 34, parallel with shoulder 32, which confronts the latter. An O-ring is set in frictional, circumscribing engagement with a straight, cylindrical area 38 of the shank portion.

Upon a hexagonal wrench being passed through bore 16 and engaged with the recess 30, the tool can be used to turn the nosepiece 24 and force it, against the bias of the O-ring 36, to retract into the mating end of the body 12. As a consequence thereof, the O-ring 36 is compressed between the shoulder 32 and the end surface 34 of the body, increases in its outside diameter, only, and comes into fluid-sealing engagement with the inner surface of such tube in which the plug 10 shall have been disposed to close off fluid flow through such tube.

Like that disclosed in the aforecited U.S. Pat. No. 4,385,643, the plug 10 comprises means for effecting a sure, gripping engagement thereof with the inner surface of a tube into which it is disposed. The body 12 has a ramp surface 40 formed thereon defined of increasing diameters. Four jaws 42 are clustered about the body 12, and are held in place by a circumscribing O-ring 44. Optionally, however, a spring-retainer could be used in lieu of the O-ring 44. Each jaw defines substantially a sector or quadrant of a circle, in cross-section, and has a radial land 46 in which is formed an arcuate groove 48 for nesting the O-ring 44 (or an optional spring-retainer). Each jaw 42 also has a projecting limb 50 which terminates with external serrations or teeth 52. The end of the bore 16 which is opposite the nosepiece 24 has a hexagonal recess 54 formed therein, and the complementary end of the nut 22 has spanner wrench holes 56. Accordingly, by securing the body 12 in position, i.e., holding it against rotation, with a wrench in recess 54, and torquing the nut 22 along the body, toward the nosepiece 24, the jaws 42 move axially and expand into fast, gripping engagement with the inner surface of such tube as the plug has been engaged with.

The aforesaid recess-end of the body 12 has an annular relief 2 formed therein, the latter receiving therein a thread-seal O-ring 4. Finally, an end-received lock nut 6, threadedly engaged with threads 18, is torqued up against the O-ring 4 securely to seal up the threads 18.

In the FIG. 3 embodiment of the novel plug 10a, that which defines a body having a threaded bore is the long nut 58. For relating embodiment 10a to embodiment 10, however, in the ensuing description, the aforesaid component shall be identified as a nut-body 58. The latter has a bore 60 which is threaded at one end 62 thereof. The nosepiece 64 has a shank 66 which is of considerable length. The end of the shank is threaded, and threadedly engages the nut-body 58. The terminal end of the shank 66 has a hexagonal recess 68 which serves the same manipulatable, tool-receiving function as does recess 30 of plug 10. The shank 66 terminates at the nose 70 of the nosepiece 64 in another circumferential shoulder 72 which is normal to the axis 14a of the plug 10a. An O-ring seal 36a is frictionally engaged with the shank 66, about the terminating end thereof adjacent to the shoulder 72. Slidably engaged with, and circumscribing the shank 66, are annuluses 74, 76 and 78. The latter is positioned adjacent to O-ring 36a, and annuluses 74 and 76 are set against the nut-body 58, with another O-ring 80 interposed therebetween. In between annuluses 76 and 78 is an annular sleeve 82.

In use, plug 10a is inserted into a tube which needs to be sealed, and the nut-body 58 and nosepiece 64 are torqued into tight engagement. The annuluses 74, 76 and 78, and the annular sleeve 82, are metal, like the nut-body 58 and nosepiece 64, and consequently, the O-rings 36a and 80 effect fluid sealing for being compressed and expanded in outside diameter.

As in the embodiment 10, plug 10a too has the annular relief 2 with a thread-seal O-ring 4 nested therein, and a securing lock nut 6 torqued up on the threaded end of the nosepiece shank 66. In addition, the nut-body 58 has a reduced-diameter portion which defines an annular shoulder 59. For further sealing security, a crush ring 8 is set up against the shoulder 59.

The third embodiment of the novel plug 10b, shown in FIGS. 4 and 5, is substantially similar to that of plug 10a. Consequentially, same or similar index numbers noted thereon denote same or similar components as in plug 10a. In this third embodiment, however, the annular sleeve 82 is supplanted with a wedging-gripping assembly 84.

The wedging-gripping assembly 84, of plug 10b, is somewhat similar to the jaws arrangement of plug 10. Four dual-tapered jaws 86 are constrained about the shank 66 be means of an O-ring 88 (although, optionally, a retainer-spring could be used in lieu thereof). Further, each of the jaws, on the outermost surface thereof, has teeth-like knurling 90. A pair of cooperating wedge rings 92 and 94 underlie opposite ends of the jaws 86. The jaws 86 have tapers at opposite ends thereof which are complemented by tapers in the interfacing surfaces of the rings 92 and 94. Now, when the nut-body 58 and nosepiece 67 are relatively torqued into tight engagement, the rings 92 and 94 urge the jaws outwardly, i.e., radially, into gripping engagement with a to-be-sealed tube.

The jaws 86 and the rings 92 and 94 are all formed of steel, although other solid materials could be used in substitution therefor.

The FIG. 6, fourth embodiment 10c has a nut-body 58', and a nosepiece 64' with an elongate, threaded shank 66'. Circumscribing the shank 66' are a pair of annular sleeves 82'. In response to a torquing of the nut-body 58' along the shank 66', the sleeves 82' move toward the enlarged, nose-end of the nosepiece 64'. As a consequence thereof, the sleeves 82' compress and radially expand the sealing O-ring 36', and cause the jaws 42' to ramp along the tapered surface of the nosepiece to come into gripping engagement with a tube.

Embodiment 10c incorporates a further novel feature in the use of back-up rings 96. The function of the back-up rings 96 will be explained in connection to an exemplary situation. It will be assumed that the diameter of the cylindrical end of the nosepiece 64' and that of the sleeves 82' (i.e., the outside diameter of sleeves 82') is 0.498 inches, and the plug 10c is put to use to seal off a tube having an inside diameter of 0.50 inches. It will perform well, and torquing of the nut-body 58' will amply move the jaws 42' into gripping engagement and sealingly expand the O-ring 36'. However, if the so-dimensioned plug must seal off a tube having an inside diameter of 0.575 inches, and the next-size plug has nosepiece and sleeves outside diameters of 0.60 inches, obviously it will not be usable. That is, the next size plug 10c will not enter the tube, and the afore-dimensioned plug 10c will not adequately seal either. The jaws will move into gripping engagement, but the sleeves 82' haven't sufficient radially-outward surface to cause the O-ring 36' to expand radially to the 0.575 diameter. To remedy the situation, the back-up rings 96, of 0.565 diameter (in this exemplary situation), are interposed between the O-ring 36' and the sleeves 82'. The back-up rings 96 present an adequate clamping surface, radially outward, to insure that the O-ring 36' is fully, radially expanded into sealing engagement with the tube. By this novel practice, plugs of given stepped diameters are all that need to be on hand, along with a series of intermediately-diametered back-up rings 96, to enable secure sealing of a great plurality of differently-dimensioned tubes.

While I have described my invention in connection with specific embodiments thereof, it is to be clearly understood that this is done only by way of example, and not as a limitation to the scope of my invention, as set forth in the objects thereof, and in the appended claims.

I claim:

1. A plug, for fluid-sealing of tubes, comprising:
a plug body having a central, longitudinal axis;
said body having a threaded bore formed therein, axially;
a nosepiece;
said nosepiece having a shank portion which is externally threaded;
said shank portion being threadedly engaged with said bore; and
said nosepiece having means manipulatable for causing said nosepiece threadedly to extend from, and retract toward said body; wherein
said shank portion comprises a straight cylindrical area, parallel with said axis, and has a solid cross-section transverse to said axis; and further including
a seal set in frictional, encircling engagement with said area; and
annuluses slidably engaged with said shank portion; wherein
said seal is interpositioned between a pair of said annuluses; and further including
gripping means encircling said nosepiece, and movable relative thereto to effect fast, gripping engagement with an inner surface of a tube; wherein
said body, said nosepiece and said annuluses together comprise means which, in response to said nosepiece being threadedly retracted toward said body, are cooperative for (a) causing said gripping means to move, relative to said nosepiece, into fast, gripping engagement with an inner surface of a tube, and (b) causing said seal to (1) be compressed, (2) increase in outside diameter only, as a result of compression thereof, and (3) effect fluid-sealing engagement with an inner surface of a tube.

2. A plug, for fluid-sealing of tubes, according to claim 1, wherein:
said nosepiece further has an external, integral ramp surface;

said ramp surface has a plurality of increasing outside diameters; and said gripping means comprises a plurality of jaws externally and independently engaged with said ramp surface.

3. A plug, for fluid-sealing of tubes, according to claim 1, wherein:

another pair of said annuluses comprise wedge rings; and said gripping means comprises a plurality of jaws externally and concentrically engaged with said wedge rings.

4. A plug, for fluid-sealing of tubes, according to claim 3, wherein:

each of said jaws of said plurality thereof encompasses a sector of a circle of circumferential extent, relative to said wedge rings, which is equal to that of any of the other of said jaws.

5. A plug, for fluid-sealing of tubes, according to claim 3, wherein:

said jaws of said plurality thereof together encompass substantially a full circle, in encirclement of said wedge rings; and further including means constraining said jaws of said plurality thereof in engagement with said wedge rings.

6. A plug, for fluid-sealing of tubes, according to claim 1, wherein:

said nosepiece further has a circumferential shoulder, normal to said axis; and further including a second seal set in frictional, encircling engagement with said shank portion and against said shoulder; and wherein one of said annuluses has a flat, circumferential surface, parallel with said shoulder, and coactive with the latter for causing said second seal to (a) be compressed between said shoulder and said one annulus, (b) increase in outside diameter only, as a result of compression thereof, and (c) effect fluid-sealing engagement with an inner surface of a tube.

7. A plug, for fluid-sealing of tubes, according to claim 1, wherein:

said annuluses comprise a pair of back-up rings;

said back-up rings are interposed between said seal and said pair of annuluses, and are in contacting engagement with said seal and said pair of annuluses; and said back-up rings are of greater outside diameter than said annuluses of said pair thereof.

8. A plug, for fluid-sealing of tubes, according to claim 3, wherein:

said wedge rings comprise means for extending said jaws of said plurality thereof radially outward relative to said nosepiece.

9. A plug, for fluid-sealing of tubes, comprising:

a plug body having a central, longitudinal axis;

said body having a threaded bore formed therein, axially;

a nosepiece;

said nosepiece having a shank portion which is externally threaded;

said shank portion being threadedly engaged with said bore; and said shank portion having means manipulatable for causing said nosepiece threadedly to extend from, and retract toward said body; wherein said shank portion comprises a straight cylindrical area, concentric with said axis, and has a solid cross-section transverse to said axis; and further including a seal set in frictional, encircling engagement with said area; and a plurality of annuluses slidably engaged with said shank portion; wherein said seal is interpositioned between a pair of said annuluses; and further including gripping means encircling said nosepiece, and movable relative thereto effect fast, gripping engagement with an inner surface of a tube; and a pair of back-up rings; wherein said back-up rings are interposed between said seal and said pair of annuluses, and are in contacting engagement with said seal and said pair of annuluses;

said annuluses of said pair thereof have a common, given, outside diameter; and said back-up rings have a common, outside diameter which is greater than said given diameter.

* * * * *